Feb. 11, 1941.                F. H. GULLIKSEN                    2,231,715
                         ANGLE SWITCHING CONTROL
                           Filed Sept. 7, 1939
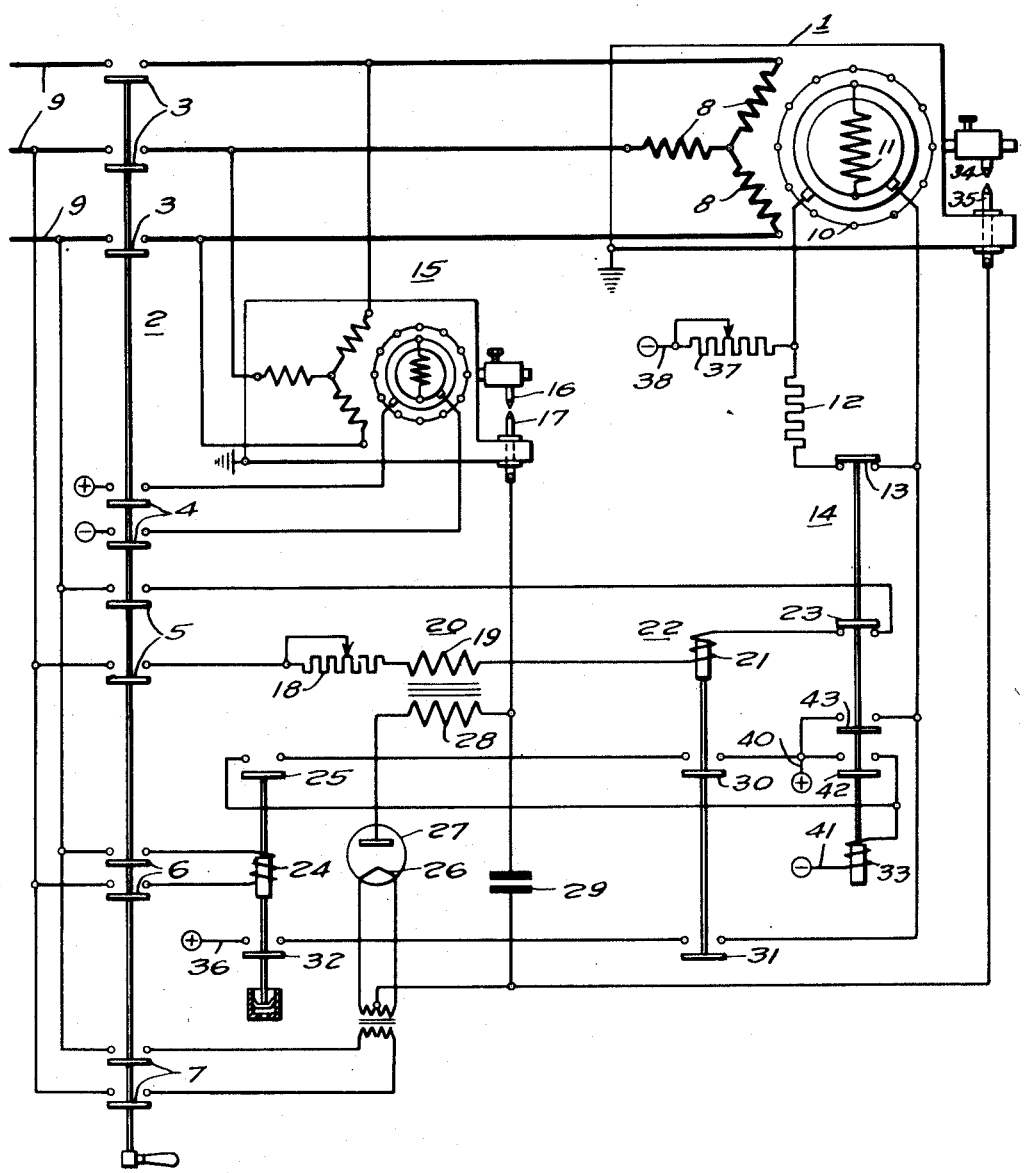
WITNESSES:                                                INVENTOR
                                                       Finn H. Gulliksen.
                                                             BY
                                                       Paul E. Friedemann
                                                           ATTORNEY Patented Feb. 11, 1941

2,231,715

UNITED STATES PATENT OFFICE 2,231,715

ANGLE SWITCHING CONTROL

Finn H. Gulliksen, Pittsburgh, Pa., assignor to Westinghouse Electric & Manufacturing Company, East Pittsburgh, Pa., a corporation of Pennsylvania Application September 7, 1939, Serial No. 293,732

9 Claims. (Cl. 171—118)

My invention relates to systems of control for synchronous motors, and more particularly to systems of control that provide for a maximum pull-in torque of the motor being synchronized.

Many schemes have heretofore been proposed for synchronizing synchronous motors so as to obtain maximum pull-in torque, however, these devices often lack accuracy, are complicated, and are usually expensive.

One of the objects of my invention is to provide a simple, inexpensive, and highly accurate synchronous motor starting scheme for synchronous motors.

Other objects and advantages will become more apparent from a study of the following specification and the accompanying single figure of a drawing, in which, is illustrated diagrammatically one of the embodiments of my invention.

In the single figure reference character 1 designates a motor whose rotor is to be synchronized so that a given point on the rotor, or shaft, holds a selected position to a corresponding point on the rotor, or shaft, of the motor 15.

The motor 15 may be a large motor driving a load similar to the load operated by motor 1 or it may be a relatively small pilot motor operating at no load so that it synchronizes in a very short time interval.

As shown in the figure, the main line switch, or contactor 2, connects both motors 1 and 15 to the buses 9 and also provides direct current excitation to motor 15 so that this motor synchronizes.

The control circuits are also energized by the main switch 2. The control circuits include a time limit relay 24, which prevents premature energization of the field winding 11 of the motor, an electric discharge device 27, a capacitor 29, a transformer 20, a high speed field switch 22, a main field contact 14, and other elements to be discussed hereinafter.

A better understanding of the merits of my invention may be had from a study of a typical starting sequence of the motor 1. To start the motor, the attendant either through automatic means or manual means operates the main line contactor 2 to close the contact members 3, 4, 5, 6 and 7.

Closure of contact members 3 connects the armature windings 8 of the motor 1 to the buses 9 and the motor starts operating as an induction motor on the damper winding 10. An alternating current of line frequency is at first induced in the field windings 11. The frequency of this current rapidly decreases as the motor speed increases and the current so induced discharges through the discharge resistor 12 and the back contact members 13 of the main field contactor 14. At the balancing speed, the frequency of the current in the field is relatively low and varies somewhat.

Closure of contact members 3 and 4 causes the energization of pilot motor 15 with both alternating current and direct current, and since motor 15, for the particular showing herein made, is a small machine operating at no load it will synchronize substantially instantaneously. The electrodes 16 and 17, mounted on the rotor and stator, respectively, will thus move adjacent each other at a constant frequency. Electrode 16 is adapted for circumferential adjustment on the shaft of motor 15. This means that the electrodes 16 and 17 will be adjacent each other when the rotating flux in the stator holds a given position in space.

Closure of contact members 5 connects the primary winding 19 of high voltage transformer 20 to two of the buses 9 by a circuit through the lower contact members 5 the voltage adjusting resistor 18, primary winding 19 of the transformer 20, actuating coil 21 of high speed field contactor 22, the back contact members 23 of the main field contactor, and the upper contact members 5.

Closure of contact members 6 energizes the time limit device. This time limit device may be of any adjustable kind and is so adjusted that its contact members 25 close as soon as the motor 1 is up to its balancing speed for any maximum load normally expected on motor 1.

Closure of contact members 7 energizes the cathode 26 of the rectifier tube 27 so that this cathode is immediately heated and thus rectifies the current of the secondary winding 28 of the transformer 20 to thus charge the capacitor 29. The transformer 20 is preferably a "Neon light" type of transformer connected to charge the capacitor to a voltage of approximately 5000 volts.

The high speed field contactor, as heretofore explained, has its operating coil 21 connected in series with the primary winding 19 of the transformer 20. At the instant of energization of the primary winding 19, there will be a rush of current through coil 21 to operate this contactor to close the contact members 30 and 31, however, since these contact members are in series respectively with contact members 25 and 32 which are open at this stage, no energizing circuits are established for the actuating coil 33 for the main field contactor 14 and the field winding 7, respectively.

After energization of the rectifier 27, the capacitor 29 becomes fully charged in a relatively short time interval and thereafter only the transformer exciting current flows through the coil 21 and the high speed field contactor remains deenergized with the result contact members 30 and 31 remain open. From time to time during the accelerating period of motor 1, electrodes 16 and 34 will for an instant be adjacent the electrodes 17 and 35, respectively. When this occurs capacitor 29 discharges through these electrodes. A current impulse will thus pass through coil 21 to operate this high speed contactor but since contact members 25 and 32 are still open, no field excitation of field 11 occurs.

After a predetermined interval of time, contact members 32 and 25 close either in the order named or simultaneously.

The very first time after the closure of contact members 25 and 32 that electrodes 16 and 34 simultaneously line up with electrodes 17 and 35, respectively, capacitor 29 discharges. The secondary 28 thus becomes short-circuited while capacitor 29 is again being charged by rectifier 27. This increases the current through coil 21 approximately 500 per cent, depending on the characteristics of the electric units selected, thereby causing the substantially instantaneous closing of contact members 30 and 31.

Since electrode 34 is made circumferentially adjustable on the shaft of motor 1, the closing of contact members 31 can be controlled so that a given point on the shaft of motor 1 will have a definite angular relation, or mechanical phase displacement, to a corresponding point on the shaft of motor 15. Further, since motor 15 operates at synchronous speed, the field winding 11 through the closure of contact members 31 may be energized at an instant when a given point on the pole pieces carrying the field windings holds a selected position to a given point on the wave of flux rotating in the stator. The preferred arrangement will of course be to get motor 1 excited with direct current at an instant that will provide maximum pull-in torque.

The field energizing circuit established by contactor 22 may be traced from positive conductor 36 through contact members 32 of time limit device 24, contact members 31 of the high speed field contactor 22, field winding 11, and field rheostat 37 to the negative conductor 38.

Operation of contactor 22 also establishes a circuit from the positive conductor 40, through contact members 30 of contactor 22, contact members 25 of time limit device 24, and actuating coil 33 of the main field contactor 14, to the negative conductor 41. The main field contactor 14 is thus caused to operate. The main field contactor thus establishes a holding circuit for itself through contact members 42, an energizing circuit for the field 11 through contact members 43, and an open circuit for coil 21 by the opening of contact members 23.

Motor 15 need not be a small pilot motor but may be a motor of considerable size driving a load as for instance a motor the same in rating as motor 1 and driving a load as a compressor. In compressor operation, it is usually very desirable, where two or more motors are connected to the same source, to so operate the motors that the compression strokes always occur in succession and not simultaneously.

By a suitable relative adjustment of the electrodes on all the motor shafts, the mechanical phase position of corresponding points on the motor shafts can be predetermined. The preferred adjustment would, of course, be such that the compressor crank arms, when all motors have synchronized, hold different instantaneous positions in space. Furthermore, each motor as it synchronizes pulls into synchronism with a maximum pull-in torque. The supply is thus subjected to the minimum disturbance as a plurality of motors are connected to the supply.

I am, of course, aware that others, particularly after having had the benefit of the teaching of my invention, may devise other angle switching schemes for accomplishing the same or similar results. I, therefore, do not wish to be limited to the particular showing herein made but wish to be limited only by the scope of the claims hereto appended and such prior art as may be pertinent.

I claim as my invention:

1. In a system of control for an alternating current motor, in combination, a source of alternating current, a source of direct current, a synchronous motor having an armature winding connected to said source of alternating current and a field winding connected to said source of direct current operating at synchronism, an electrode fixed on the stationary portion of the motor and an electrode fixed on the rotating portion of the motor so that, at synchronous speed, the electrodes will be adjacent each other each time a given point on the rotating portion holds a given position in space, a second synchronous motor having an armature winding and a field winding, means adapted to connect the armature winding to said source of alternating current to thus accelerate the rotating portion of the motor operating as an induction motor, an electrode on the stationary portion, an electrode on the rotating portion, said electrodes being so positioned that they move adjacent each other at each revolution of the rotating portion, a field switch, field excitation control means comprising, a capacitor, means for charging the capacitor, said capacitor being connected in series with said electrodes to thus be discharged each time the electrodes of one motor are adjacent each other at the same instant the electrodes of the other motor are adjacent each other, and means responsive to the discharge current of the capacitor adapted to cause operation of said field switch, and time limit means for delaying the effective operation of the field excitation control means.

2. In a system of control for an alternating current motor, in combination, a source of alternating current, a source of direct current, a synchronous motor having an armature winding connected to said source of alternating current and a field winding connected to said source of direct current operating at synchronism, an electrode fixed on the stationary portion of the motor and an electrode fixed on the rotating portion of the motor so that, at synchronous speed, the electrodes will be adjacent each other each time a given point on the rotating portion holds a given position in space, a second synchronous motor having an armature winding and a field winding, means adapted to connect the armature winding to said source of alternating current to thus accelerate the rotating portion of the motor operating as an induction motor, an electrode on the stationary portion, an electrode on the rotating portion, said electrodes being so positioned that they move adjacent each other at each revolution of the rotating portion, and field excitation control means comprising a main field contactor adapted to connect the field winding of the second motor to said source of direct current, a time limit device for preventing the energization of the field contactor for a selected time interval after connection of the armature of the second motor to the source of alternating current, a high speed field switch adapted to energize the main field contactor and also adapted to energize the field winding of the second motor with direct current, a condenser, means for charging the condenser, means for energizing the high speed field switch in response to the discharge of the condenser, said condenser being connected in series with said four electrodes to thus discharge when both pair of electrodes are simultaneously adjacent to each other whereby the field winding of the second motor is energized at an instant when the rotors of the two motors have a definite angular position to each other.

3. In a system of control for an alternating current motor, in combination, a source of alternating current, a source of direct current, a synchronous motor having an armature winding connected to said source of alternating current and a field winding connected to said source of direct current operating at synchronism, an electrode fixed on the stationary portion of the motor and an electrode fixed on the rotating portion of the motor so that, at synchronous speed, the electrodes will be adjacent each other each time a given point on the rotating portion holds a given position in space, a second synchronous motor having an armature winding and a field winding, means adapted to connect the armature winding to said source of alternating current to thus accelerate the rotating portion of the motor operating as an induction motor, an electrode on the stationary portion, an electrode on the rotating portion, said electrodes being so positioned that they move adjacent each other at each revolution of the rotating portion, a field switch adapted to connect the field winding of the second motor to the said source of direct current, time limit means adapted to prevent operation of the main field switch for a selected time interval after the connection of the armature winding of the second motor to said source of alternating current, and means comprising, a capacitor, means for charging the capacitor, said capacitor being connected in series with said electrodes to thus be discharged each time the electrodes of one motor are adjacent each other at the same instant the electrodes of the other motor are adjacent each other, and means responsive to the discharge current of the capacitor adapted to cause operation of said field switch.

4. In combination, a pair of rotating shafts, an angularly adjustable electrode on each shaft, two fixed electrodes disposed so that the electrodes on the respective shafts move opposite each of the fixed electrodes once during every revolution of each shaft, a capacitor connected in series circuit with the four electrodes, means for charging the capacitor, said electrodes being so spaced that when the two movable electrodes are respectively adjacent the fixed electrodes the capacitor discharges, and an electromagnetic device connected to be energized each time said capacitor discharges.

5. In a system of control for energizing an electromagnetic device, in combination, an electromagnetic device, a capacitor adapted to cause energization of said device each time said capacitor discharges, means for charging the capacitor, a fixed electrode, a movable electrode adapted to periodically move adjacent the fixed electrode, a second fixed electrode, a second movable electrode adapted to aperiodically move adjacent the second fixed electrode, and means for connecting the capacitor in series with the electrodes so that the capacitor discharges each time the second movable electrode is adjacent the second fixed electrode at the same instant the first movable electrode is adjacent the first fixed electrode.

6. In a system of control, in combination, an electromagnetic device, a source of direct current, an electromagnetically operable switch for connecting said device to said source of direct current, said switch having an actuating coil, an energized transformer having its primary winding connected in series with the actuating coil of said switch, a thermionic rectifier and a capacitor connected in circuit with the secondary winding whereby said capacitor becomes fully charged, a fixed electrode, a movable electrode adapted from time to time to move adjacent the fixed electrode, a second fixed electrode, a second movable electrode adapted, in longer time periods, from time to time move adjacent the second fixed electrode whereby the second movable electrode will, at still different time intervals, from time to time be adjacent the second fixed electrode at the same instant that the first movable electrode is adjacent the first fixed electrode, said capacitor, being connected in circuit with the electrodes will thus discharge each time when said first pair of electrodes are adjacent each other at the same time the second pair of electrodes are adjacent each other, and the primary winding of the transformer is thus caused to carry a heavier current to thus energize the actuating coil which in turn causes the operation of said switch.

7. In a system of control, in combination, a rectifier, a capacitor and a transformer having its secondary winding connected in series with the rectifier and capacitor so that the capacitor becomes charged when the primary winding is energized with alternating current, means for energizing the primary winding with alternating current, an electromagnetic device connected in series with the primary winding, a pair of relatively movable contact elements adapted to periodically move adjacent to each other and a pair of relatively movable contact elements adapted to aperiodically move adjacent each other connected across the capacitor terminals so that the capacitor discharges each time the respective pairs of contact elements are simultaneously adjacent each other, whereby the electro-magnetic device becomes energized to operate, a motor field winding, and switching means responsive to the operation of said electromagnetic device adapted to connect the field winding to a source of direct current.

8. In a system of control, in combination, a source of direct current, a motor field winding, a main field switch adapted to connect the field winding to the source of direct current, a high speed field switch adapted to rapidly connect the field winding to the source of direct current and to cause the operation of the main field switch, two rotating shafts one rotating at one speed and the other at a lower speed having electrodes mounted thereon, the electrode on one shaft having a different position with reference to a given point on the shaft than the electrode on the other shaft has with reference to a point on that shaft corresponding to the given point on the first shaft, and means comprising, a capacitor, means for charging the capacitor, said capacitor being connected in series with said electrodes to be discharged each time the electrode of one shaft holds a given position in space to the position of the electrode of the other shaft, and means responsive to the discharge of the capacitor for operating said high speed field switch.

9. In a system of control, in combination, a source of direct current, a motor field winding, a field switch adapted to connect the field winding to the source of direct current, two rotating shafts one rotating at one speed and the other at a lower speed having electrodes mounted thereon, the electrode on one shaft having a different position with reference to a given point on the shaft than the electrode on the other shaft has with reference to a point on that shaft corresponding to the given point on the first shaft, and means comprising, a capacitor, means for charging the capacitor, said capacitor being connected in series with said electrodes to be discharged each time the electrode of one shaft holds a given position in space to the position of the electrode of the other shaft, and means responsive to the discharge of the capacitor for operating said field switch.

FINN H. GULLIKSEN.